US011458952B2

(12) United States Patent
Okuda et al.

(10) Patent No.: US 11,458,952 B2
(45) Date of Patent: Oct. 4, 2022

(54) HYBRID VEHICLE AND METHOD FOR CONTROLLING HYBRID VEHICLE

(71) Applicant: TOYOTA JIDOSHA KABUSHIKI KAISHA, Toyota (JP)

(72) Inventors: Koichi Okuda, Toyota (JP); Atsushi Tabata, Okazaki (JP); Yasutaka Tsuchida, Toyota (JP); Yuuki Makino, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 264 days.

(21) Appl. No.: 17/008,519

(22) Filed: Aug. 31, 2020

(65) Prior Publication Data

US 2021/0061257 A1 Mar. 4, 2021

(30) Foreign Application Priority Data

Sep. 2, 2019 (JP) .............................. JP2019-159530

(51) Int. Cl.
*B60W 20/15* (2016.01)
*B60W 10/06* (2006.01)
(Continued)

(52) U.S. Cl.
CPC ............ *B60W 20/15* (2016.01); *B60W 10/06* (2013.01); *B60W 10/08* (2013.01); *B60W 10/10* (2013.01);
(Continued)

(58) Field of Classification Search
CPC .. B60K 2006/381; B60K 6/383; B60K 6/387; B60K 6/445; B60K 6/52; B60K 6/547; B60W 10/06; B60W 10/08; B60W 10/10; B60W 10/12; B60W 20/15; B60W 2552/40; B60W 2555/20; B60W 2710/0644; B60W 30/18172; B60W 40/068

See application file for complete search history.

(56) References Cited

U.S. PATENT DOCUMENTS 8,874,295 B2 * 10/2014 Terakawa .............. B60W 20/19
180/65.265
9,896,108 B2 * 2/2018 Kato ...................... B60W 10/10
(Continued)

FOREIGN PATENT DOCUMENTS

JP 2008-247205 A 10/2008
JP 2011-218871 A 11/2011

Primary Examiner — Carl C Staubach
(74) Attorney, Agent, or Firm — Hunton Andrews Kurth LLP

(57) ABSTRACT

In a hybrid vehicle including an engine, a first motor, a differential unit, a second motor, a driving force split device, and a controller, the controller is configured to control the engine, the first motor, and the second motor such that the hybrid vehicle travels with the engine rotating within a range of an allowable maximum rotational speed for control or less. In this case, the controller is configured to set the allowable maximum rotational speed such that the allowable maximum rotational speed is higher when a main-side ratio is lower than when the main-side ratio is higher. The main-side ratio is a ratio of a driving force that is transmitted to main drive wheels to the total driving force that is transmitted from a drive shaft to the main drive wheels and sub drive wheels via the driving force split device.

8 Claims, 9 Drawing Sheets

(51) Int. Cl.
*B60W 10/08* (2006.01)
*B60W 10/10* (2012.01)
*B60W 40/068* (2012.01)
*B60W 30/18* (2012.01)
*B60W 10/12* (2012.01)

(52) U.S. Cl.
CPC ...... *B60W 10/12* (2013.01); *B60W 30/18172* (2013.01); *B60W 40/068* (2013.01)

(56) References Cited

U.S. PATENT DOCUMENTS

| | | | |
|---|---|---|---|
| 10,532,735 B2 * | 1/2020 | Debert | B60W 30/188 |
| 10,940,750 B2 * | 3/2021 | Pan | B60K 6/365 |
| 2004/0163860 A1 * | 8/2004 | Matsuzaki | B60K 6/44 |
| | | | 290/46 |
| 2013/0151057 A1 * | 6/2013 | Matsubara | B60W 10/02 |
| | | | 180/65.265 |
| 2020/0307370 A1 * | 10/2020 | Nabeshima | B60K 6/40 |
| 2021/0039622 A1 * | 2/2021 | Tabata | B60W 10/12 |
| 2021/0070266 A1 * | 3/2021 | Tabata | B60K 6/365 |
| 2021/0284017 A1 * | 9/2021 | Tabata | B60W 10/184 |

\* cited by examiner

HYBRID VEHICLE AND METHOD FOR CONTROLLING HYBRID VEHICLE

CROSS-REFERENCE TO RELATED APPLICATION

This application claims priority to Japanese Patent Application No. 2019-159530 filed on Sep. 2, 2019, incorporated herein by reference in its entirety.

BACKGROUND

1. Technical Field

The disclosure relates to a hybrid vehicle and a method for controlling a hybrid vehicle.

2. Description of Related Art

Conventionally, a hybrid vehicle is proposed which includes: an engine; a first motor; a differential unit including three rotary elements connected to a drive shaft coupled to drive wheels, the engine, and the first motor; and a second motor connected to the drive shaft (see, e.g., Japanese Unexamined Patent Application Publication No. 2008-247205 (JP 2008-247205 A)). In this hybrid vehicle, an allowable maximum rotational speed of the engine is set by subtracting a margin from the lowest value out of a maximum rotational speed of the engine based on the capability of the engine, a maximum rotational speed of the engine based on the capability of the first motor, and a maximum rotational speed of the engine based on the capability of the differential unit. A desired rotational speed of the engine is set within the range of the allowable maximum rotational speed or less, and the engine, the first motor, and the second motor are controlled so that the hybrid vehicle travels with the engine being operated at the desired engine rotational speed. The engine and the first motor are thus restrained from rotating at high speeds.

A vehicle is also proposed which includes: an engine; a transmission coupled to the engine; and a transfer case coupled to the transmission, a front propeller shaft coupled to the front wheels that are sub drive wheels, and a rear propeller shaft coupled to the rear wheels that are main drive wheels (see, e.g., Japanese Unexamined Patent Application Publication No. 2011-218871 (JP 2011-218871 A)). The transfer case is capable of continuously changing the front-to-rear driving force split between, e.g., 0:100 and 50:50. The front-to-rear driving force split indicates how the driving force that is output from the engine via the transmission is split between the front wheels and the rear wheels.

SUMMARY

Some recent hybrid vehicles have a hardware configuration in which parts on the drive wheel side of the drive shaft of the hybrid vehicle described in JP 2008-247205 A are replaced with the transfer case, the front propeller shaft, the front wheels, the rear propeller shaft, the rear wheels, etc. of JP 2011-218871 A. In this hardware configuration, the tendency for the wheel to slip due to idling typically varies between the front and rear wheels according to the main-side ratio. The main-side ratio is the ratio of the driving force that is transmitted to the main drive wheels to the total driving force that is transmitted from the drive shaft to the main drive wheels and the sub drive wheels through a driving force split device. Accordingly, the following problem may occur in the case where the allowable maximum rotational speed of the engine is set in this hardware configuration in the manner as described in JP 2008-247205 A. Specifically, when the allowable maximum rotational speed of the engine is always set to a relatively low value regardless of the main-side ratio, the rotational speed of the engine is excessively limited when the front and rear wheels are less likely to slip due to idling. This may cause deterioration in drivability.

The disclosure provides a hybrid vehicle and a method for controlling a hybrid vehicle which achieve both protection of parts and reduction in deterioration in drivability.

A first aspect of the disclosure relates to a hybrid vehicle including an engine, a first motor, a differential unit, a second motor, a driving force split device, and a controller. The differential unit includes three rotary elements connected to a drive shaft, the engine, and the first motor. The second motor is configured to output a driving force to the drive shaft. The driving force split device is configured to transmit the driving force from the drive shaft to a main drive wheel and a sub drive wheel and to adjust a main-side ratio, the main-side ratio being a ratio of the driving force that is transmitted to the main drive wheel to the total driving force that is transmitted from the drive shaft to the main drive wheel and the sub drive wheel via the driving force split device. The controller is configured to control the engine, the first motor, and the second motor such that the hybrid vehicle travels with the engine rotating within a range of an allowable maximum rotational speed for control or less. The controller is configured to set the allowable maximum rotational speed such that the allowable maximum rotational speed is higher when the main-side ratio is lower than when the main-side ratio is higher.

A second aspect of the disclosure relates to a method for controlling a hybrid vehicle including an engine, a first motor, a differential unit, a second motor, and a driving force split device. The differential unit includes three rotary elements connected to a drive shaft, the engine, and the first motor. The second motor is configured to output a driving force to the drive shaft. The driving force split device is configured to transmit the driving force from the drive shaft to a main drive wheel and a sub drive wheel and to adjust a main-side ratio, the main-side ratio being a ratio of the driving force that is transmitted to the main drive wheel to the total driving force that is transmitted from the drive shaft to the main drive wheel and the sub drive wheel via the driving force split device. The method includes: controlling the engine, the first motor, and the second motor such that the hybrid vehicle travels with the engine rotating within a range of an allowable maximum rotational speed for control or less; and setting the allowable maximum rotational speed such that the allowable maximum rotational speed is higher when the main-side ratio is lower than when the main-side ratio is higher.

According to the hybrid vehicle of the first aspect and the method for controlling the hybrid vehicle of the second aspect, the engine, the first motor, and the second motor are controlled such that the hybrid vehicle travels with the engine rotating within the range of the allowable maximum rotational speed for control or less. In this case, the allowable maximum rotational speed is set such that the allowable maximum rotational speed is higher when the main-side ratio, which is the ratio of the driving force that is transmitted to the main drive wheel to the total driving force that is transmitted from the drive shaft to the main drive wheel and the sub drive wheel via the driving force split device, is lower than when the main-side ratio is higher. When the main-side ratio is relatively low (e.g., 0.5 or 0.6), the difference in driving force between the main and sub drive wheels is typically smaller and the main and sub drive wheels are less likely to slip due to idling, as compared to when the main-side ratio is relatively high (e.g., 0.9 or 1.0). Accordingly, when the main-side ratio is relatively high, the allowable maximum rotational speed of the engine is set to a relatively low value. The rotational speed of the engine is thus more sufficiently restrained from becoming higher than a maximum rotational speed for part protection that is higher than the allowable maximum rotational speed. Parts are thus more sufficiently protected. When the main-side ratio is relatively low, the allowable maximum rotational speed of the engine is set to a relatively high value. Parts are thus protected and deterioration in drivability is also reduced. Based on these, it can be said that both protection of parts and reduction in deterioration in drivability are achieved.

In the hybrid vehicle of the first aspect, the controller may be configured to set the allowable maximum rotational speed such that the allowable maximum rotational speed increases as the main-side ratio decreases. According to the hybrid vehicle with the above configuration, both protection of parts and reduction in deterioration in drivability are more appropriately achieved based on the main-side ratio.

In the hybrid vehicle of the first aspect, the controller may be configured to set the allowable maximum rotational speed such that the allowable maximum rotational speed decreases as an outside air temperature decreases. According to the hybrid vehicle with the above configuration, the lower the outside air temperature is, the colder the road surface is and the more likely the main and sub drive wheels are to slip due to idling. Accordingly, the allowable maximum rotational speed is set such that the allowable maximum rotational speed decreases as the outside air temperature decreases. Both protection of parts and reduction in deterioration in drivability are thus more appropriately achieved based on the main-side ratio.

In the hybrid vehicle of the first aspect, the controller may be configured to set the allowable maximum rotational speed such that the allowable maximum rotational speed is lower when the hybrid vehicle travels on a low μ road than when the hybrid vehicle travels on a road other than the low μ road, the low μ road being a road having a surface with a friction coefficient equal to or lower than a predetermined value. According to the hybrid vehicle with the above configuration, the main and sub drive wheels are more likely to slip due to idling when the hybrid vehicle travels on the low μ road than when the hybrid vehicle travels on a road other than the low μ road. Accordingly, the allowable maximum rotational speed is set such that the allowable maximum rotational speed is lower when the hybrid vehicle travels on the low μ road that is a road having a surface with a friction coefficient equal to or lower than the predetermined value than when the hybrid vehicle travels on a road other than the low μ road. Both protection of parts and reduction in deterioration in drivability are thus more appropriately achieved based on the main-side ratio.

In the hybrid vehicle of the first aspect, the controller may be configured to prohibit the allowable maximum rotational speed from increasing from a current value of the allowable maximum rotational speed when either a first condition or a second condition is satisfied, the first condition being a condition that slipping of either the main drive wheel or the sub drive wheel is detected, and the second condition being a condition that a slipping reducing function to reduce slipping of the main drive wheel and the sub drive wheel is in operation. According to the hybrid vehicle with the above configuration, the rotational speed of the engine is sufficiently restrained from becoming higher than the maximum rotational speed for part protection that is higher than the allowable maximum rotational speed, when the first condition or the second condition is satisfied.

In the hybrid vehicle of the first aspect, the controller may be configured to set the allowable maximum rotational speed by subtracting a margin from the maximum rotational speed for part protection, the maximum rotational speed for part protection being a maximum rotational speed obtained as one of a first maximum rotational speed of the engine based on capability of the engine, a second maximum rotational speed of the engine based on capability of the first motor, and a third maximum rotational speed of the engine based on capability of the differential unit. The controller may be configured to increase the allowable maximum rotational speed by reducing the margin when the main-side ratio is low as compared to when the main-side ratio is high. According to the hybrid vehicle with the above configuration, the allowable maximum rotational speed of the engine is set so as to increase as the main-side ratio decreases. Rotary parts of the hybrid vehicle are thus restrained from rotating at high speeds. Parts are thus protected and deterioration in drivability is also reduced.

The hybrid vehicle of the first aspect may further include a transmission that transmits power between an input shaft connected to the differential unit and the drive shaft with a change in gear stage. The second motor may be connected to the input shaft or the drive shaft, and the controller may be configured to set the allowable maximum rotational speed based on the main-side ratio and a rotational speed of the input shaft of the transmission. The controller of the hybrid vehicle with the above configuration can more appropriately set the allowable maximum rotational speed when the hybrid vehicle includes the transmission.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A mode for carrying out the disclosure will be described based on an embodiment.

Figure 1:
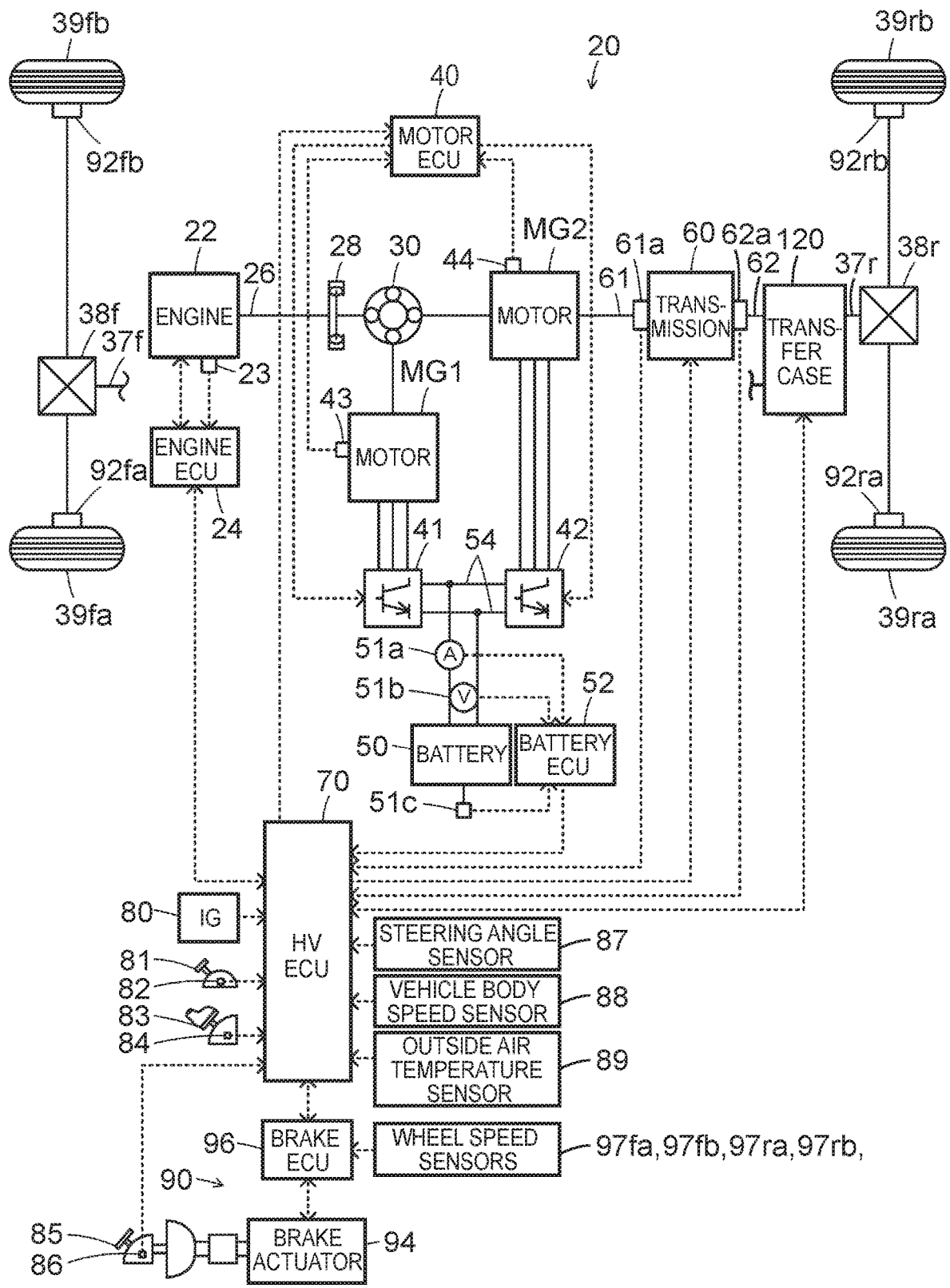
FIG. 1 is a configuration diagram illustrating the general configuration of a hybrid car according to an embodiment of the disclosure.
Figure 2:
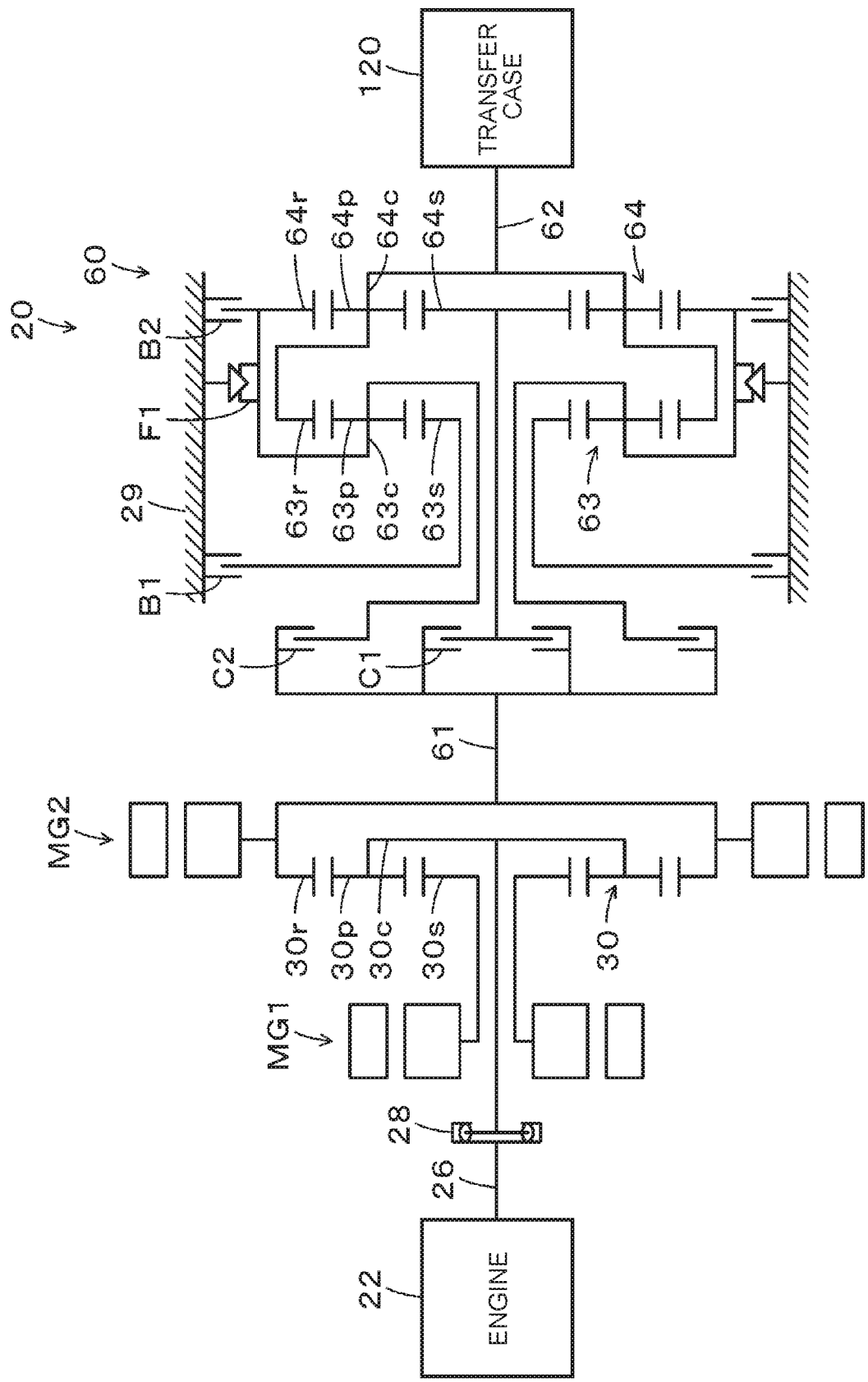
FIG. 2 is a configuration diagram illustrating the general configuration of an engine, a planetary gear, a first motor, a second motor, and a transmission shown in FIG. 1.

FIG. 1 is a configuration diagram illustrating the general configuration of a hybrid car 20 according to an embodiment of the disclosure. The hybrid car 20 is an example of a hybrid vehicle of the disclosure. FIG. 2 is a configuration diagram illustrating the general configuration of an engine 22, a planetary gear 30, a first motor MG1, a second motor MG2, and a transmission 60. The hybrid car 20 of the embodiment is configured as a rear-wheel drive four-wheel drive vehicle in which rear wheels 39ra, 39rb are main drive wheels and front wheels 39fa, 39fb are sub drive wheels. As shown in FIGS. 1 and 2, the hybrid car 20 includes the engine 22, the planetary gear 30, the first motor MG1, the second motor MG2, a first inverter 41, a second inverter 42, a battery 50, the transmission 60, a transfer case 120, a hydraulic brake device 90, and a hybrid electronic control unit (HV ECU) 70.

The engine 22 is configured as an internal combustion engine that outputs power using gasoline, light oil, etc. as fuel. An engine electronic control unit (engine ECU) 24 controls operation of the engine 22.

Although not shown in the figures, the engine ECU 24 is configured as a microprocessor mainly composed of a center processing unit (CPU). The engine ECU 24 includes, in addition to the CPU, a ROM that stores processing programs, a RAM that temporarily stores data, input and output ports, and a communication port. The engine ECU 24 receives, via the input port, signals from various sensors which are necessary to control the operation of the engine 22. An example of the signals that are input to the engine ECU 24 is a crank angle θcr of a crankshaft 26 of the engine 22 from a crank position sensor 23 that detects the rotational position of the crankshaft 26 of the engine 22. The engine ECU 24 outputs, via the output port, various control signals for controlling the operation of the engine 22. The engine ECU 24 is connected to the HV ECU 70 via the communication port. The engine ECU 24 calculates a rotational speed Ne of the engine 22 based on the crank angle θcr from the crank position sensor 23.

The planetary gear 30 is configured as a single-pinion planetary gear mechanism. The planetary gear 30 includes a sun gear 30s that is an external gear, a ring gear 30r that is an internal gear, a plurality of pinion gears 30p meshing with the sun gear 30s and the ring gear 30r, a carrier 30c that supports the pinion gears 30p such that the pinion gears 30p can rotate (turn) and revolve. The sun gear 30s is connected to a rotor of the first motor MG1. The ring gear 30r is connected to an input shaft 61 of the transmission 60. The carrier 30c is connected to the crankshaft 26 of the engine 22 via a damper 28.

The first motor MG1 is configured as, e.g., a synchronous generator motor. As described above, the rotor of the first motor MG1 is connected to the sun gear 30s of the planetary gear 30. The second motor MG2 is configured as, e.g., a synchronous generator motor. A rotor of the second motor MG2 is connected to the input shaft 61 of the transmission 60. The first inverter 41 and the second inverter 42 are used to drive the first motor MG1 and the second motor MG2 and are connected to the battery 50 via power lines 54. A motor electronic control unit (motor ECU) 40 performs switching control of a plurality of switching elements, not shown, of the first inverter 41 and a plurality of switching elements, not shown, of the second inverter 42 to rotationally drive the first motor MG1 and the second motor MG2.

Although not shown in the figures, the motor ECU 40 is configured as a microprocessor mainly composed of a CPU. The motor ECU 40 includes, in addition to the CPU, a ROM that stores processing programs, a RAM that temporarily stores data, input and output ports, and a communication port. The motor ECU 40 receives, via the input port, signals from various sensors which are necessary to control driving of the first and second motors MG1, MG2. Examples of the signals that are input to the motor ECU 40 include: rotational positions θm1, θm2 of the rotors of the first and second motors MG1, MG2 from a first rotational position sensor 43 and a second rotational position sensor 44 which detect the rotational positions of the rotors of the first and second motors MG1, MG2, respectively; and phase currents Iu1, Iv1, Iu2, Iv2 of each phase of the first and second motors MG1, MG2 from current sensors that detect a phase current flowing in each phase of the first and second motors MG1, MG2. The motor ECU 40 outputs, via the output port, signals such as switching control signals for the switching elements, not shown, of the first and second inverters 41, 42. The motor ECU 40 is connected to the HV ECU 70 via the communication port. The motor ECU 40 calculates electrical angles θe1, θe2 and rotational speeds Nm1, Nm2 of the first and second motors MG1, MG2 based on the rotational positions θm1, θm2 of the rotors of the first and second motors MG1, MG2 from the first and second rotational position sensors 43, 44.

The battery 50 is configured as, e.g., a lithium-ion secondary battery or a nickel-hydrogen secondary battery. As described above, the battery 50 is connected to the first and second inverters 41, 42 via the power lines 54. A battery electronic control unit (battery ECU) 52 manages the battery 50.

Although not shown in the figures, the battery ECU 52 is configured as a microprocessor mainly composed of a CPU. The battery ECU 52 includes, in addition to the CPU, a ROM that stores processing programs, a RAM that temporarily stores data, input and output ports, and a communication port. The battery ECU 52 receives, via the input port, signals from various sensors which are necessary to manage the battery 50. Examples of the signals that are input to the battery ECU 52 include: a current Ib of the battery 50 from a current sensor 51a attached to an output terminal of the battery 50; a voltage Vb of the battery 50 from a voltage sensor 51b attached between terminals of the battery 50; and a temperature Tb of the battery 50 from a temperature sensor 51c attached to the battery 50. The battery ECU 52 is connected to the HV ECU 70 via the communication port. The battery ECU 52 calculates a state of charge SOC of the battery 50 based on an integrated value of the current Ib of the battery 50 from the current sensor 51a. The state of charge SOC is the ratio of the remaining capacity that can be discharged from the battery 50 to the maximum capacity of the battery 50.

The transmission 60 is configured as a four-gear transmission. The transmission 60 includes the input shaft 61, an output shaft (drive shaft) 62, a first planetary gear 63, a second planetary gear 64, a first clutch C1, a second clutch C2, a first brake B1, a second brake B2, and a one-way clutch F1. As described above, the input shaft 61 is connected to the ring gear 30r of the planetary gear 30 and the second motor MG2. The output shaft 62 is connected to the transfer case 120.

The first planetary gear 63 is configured as a single-pinion planetary gear mechanism. The first planetary gear 63 includes a sun gear 63s that is an external gear, a ring gear 63r that is an internal gear, a plurality of pinion gears 63p meshing with the sun gear 63s and the ring gear 63r, and a carrier 63c that supports the pinion gears 63p such that the pinion gears 63p can rotate (turn) and revolve.

The second planetary gear 64 is configured as a single-pinion planetary gear mechanism. The second planetary gear 64 includes a sun gear 64s that is an external gear, a ring gear 64r that is an internal gear, a plurality of pinion gears 64p meshing with the sun gear 64s and the ring gear 64r, and a carrier 64c that supports the pinion gears 64p such that the pinion gears 64p can rotate (turn) and revolve.

The carrier 63c of the first planetary gear 63 and the ring gear 64r of the second planetary gear 64 are coupled (fixed) together. The ring gear 63r of the first planetary gear 63 and the carrier 64c of the second planetary gear 64 are coupled (fixed) together. Accordingly, the first and second planetary gears 63, 64 function as a four-element mechanism including four rotary elements: the sun gear 63s of the first planetary gear 63, the carrier 63c of the first planetary gear 63 and the ring gear 64r of the second planetary gear 64, the ring gear 63r of the first planetary gear 63 and the carrier 64c of the second planetary gear 64, and the sun gear 64s of the second planetary gear 64. The ring gear 63r of the first planetary gear 63 and the carrier 64c of the second planetary gear 64 are coupled (fixed) to the output shaft 62.

The first clutch C1 connects and disconnects the input shaft 61 to and from the sun gear 64s of the second planetary gear 64. The second clutch C2 connects and disconnects the input shaft 61 to and from the carrier 63c of the first planetary gear 63 and the ring gear 64r of the second planetary gear 64. The first brake B1 fixes (connects) the sun gear 63s of the first planetary gear 63 to a transmission case 29 that is a stationary member such that the sun gear 63s is not rotatable relative to the transmission case 29. The first brake B1 also releases the sun gear 63s from the transmission case 29 such that the sun gear 63s is rotatable relative to the transmission case 29. The second brake B2 fixes (connects) the carrier 63c of the first planetary gear 63 and the ring gear 64r of the second planetary gear 64 to the transmission case 29 such that the carrier 63c and the ring gear 64r are not rotatable relative to the transmission case 29. The second brake B2 also releases the carrier 63c and the ring gear 64r from the transmission case 29 such that the carrier 63c and the ring gear 64r are rotatable relative to the transmission case 29. The one-way clutch F1 allows the carrier 63c of the first planetary gear 63 and the ring gear 64r of the second planetary gear 64 to rotate in one direction and restricts rotation of the carrier 63c and the ring gear 64r in the other direction.

The first clutch C1 and the second clutch C2 are each configured as a hydraulically driven multi-disc clutch. The first brake B1 and the second brake B2 are each configured as a hydraulically driven multi-disc brake. The first and second clutches C1, C2 and the first and second brakes B1, B2 operate when a hydraulic controller (not shown) supplies and discharges hydraulic oil to and from the first and second clutches C1, C2 and the first and second brakes B1, B2.

Figures 3, 4:
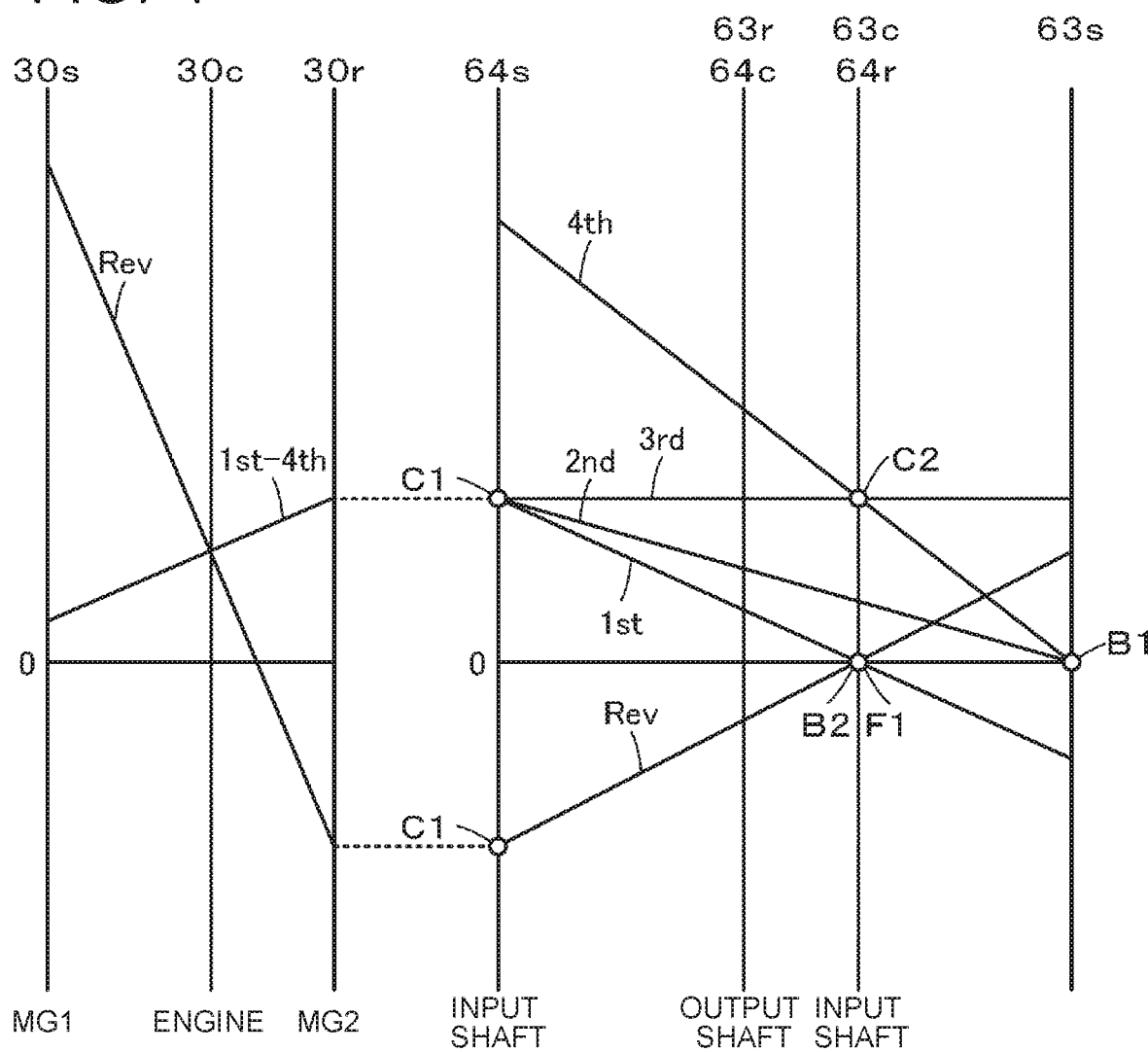
FIG. 3 is an operation table illustrating the relationship between each gear stage of the transmission shown in FIG. 2 and the operating states of a first clutch, a second clutch, a first brake, a second brake, and a one-way clutch.
FIG. 4 is a collinear chart illustrating the relationship among the rotational speeds of rotary elements of the planetary gear and the transmission.

FIG. 3 is an operation table illustrating the relationship between each gear stage of the transmission 60 and the operating states of the first clutch C1, the second clutch C2, the first brake B1, the second brake B2, and the one-way clutch F1. FIG. 4 is a collinear chart illustrating the relationship among the rotational speeds of the rotary elements of the planetary gear 30 and the transmission 60. The transmission 60 attains forward gears from first gear to fourth gear and a reverse gear by engaging or disengaging the first clutch C1, the second clutch C2, the first brake B1, the second brake B2, and the one-way clutch F1 as shown in FIG. 3.

Specifically, first forward gear is attained by engaging the first clutch C1, disengaging the second clutch C2, the first brake B1, and the second brake B2, and operating the one-way clutch F1 (causing the one-way clutch F1 to restrict the rotation of the carrier 63c of the first planetary gear 63 and the ring gear 64r of the second planetary gear 64 in the other direction (negative rotation in FIG. 4)). In first forward gear, the second brake B2 is also engaged when a braking force is output to the input shaft 61 of the transmission 60 due to regenerative driving of the second motor MG2 or motoring of the engine 22 having stopped fuel injection by the first motor MG1.

Second forward gear is attained by engaging the first clutch C1 and the first brake B1 and disengaging the second clutch C2 and the second brake B2. Third forward gear is attained by engaging the first clutch C1 and the second clutch C2 and disengaging the first brake B1 and the second brake B2. Fourth forward gear is attained by engaging the second clutch C2 and the first brake B1 and disengaging the first clutch C1 and the second brake B2. Reverse gear is attained by engaging the first clutch C1 and the second brake B2 and disengaging the second clutch C2 and the first brake B1.

The transfer case 120 is capable of continuously changing the front-to-rear driving force split between, e.g., 0:100 and 50:50. The front-to-rear driving force split indicates how the driving force that is output to the output shaft 62 of the transmission 60 is split between the front wheels 39fa, 39fb that are sub drive wheels and the rear wheels 39ra, 39rb that are main drive wheels. Accordingly, the hybrid car 20 is in two-wheel drive (2WD) mode when the front-to-rear driving force split is 0:100, and is in four-wheel drive (4WD) mode when the front-to-rear driving force split is other than 0:100. That is, the hybrid car 20 is configured as a part-time 4WD vehicle.

Figure 5:
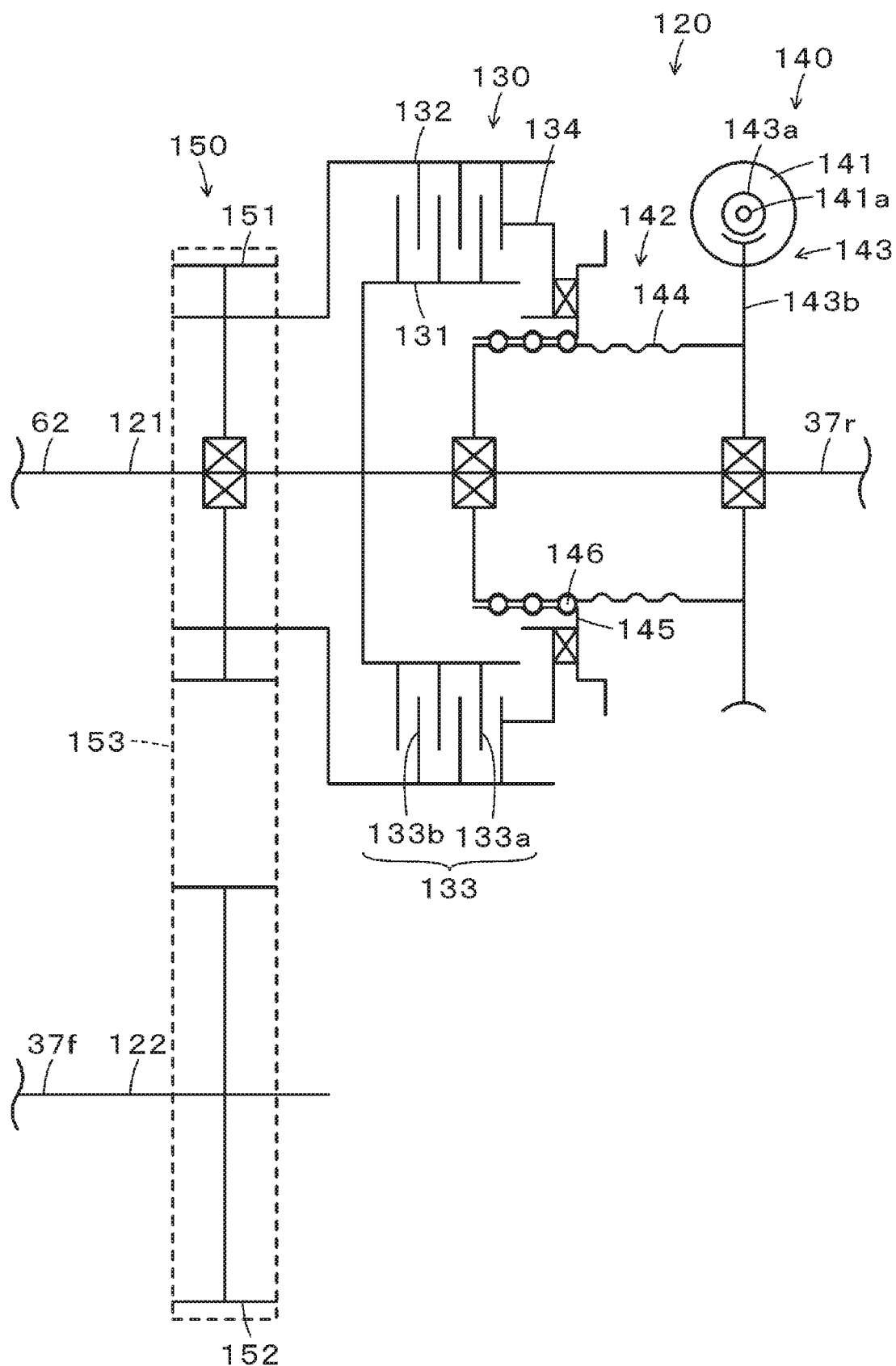
FIG. 5 is a configuration diagram illustrating the general configuration of a transfer case shown in FIG. 1.

FIG. 5 is a configuration diagram illustrating the general configuration of the transfer case 120. As shown in the figure, the transfer case 120 includes a rear wheel-side transmission shaft 121, a front wheel-side transmission shaft 122, a third clutch 130, a drive unit 140, and a transmission mechanism 150. The rear wheel-side transmission shaft 121 is coupled to the output shaft 62 of the transmission 60 (see FIG. 1) and is also coupled to a rear propeller shaft 37r (see FIG. 1). The front wheel-side transmission shaft 122 is coupled to a front propeller shaft 37f (see FIG. 1).

The third clutch 130 is configured as a multi-disc clutch. The third clutch 130 includes a clutch hub 131, a clutch drum 132, a plurality of friction engagement plates 133, and a piston 134. The clutch hub 131 is coupled to the rear wheel-side transmission shaft 121. The clutch drum 132 is coupled to a drive gear 151 of the transmission mechanism 150. The friction engagement plates 133 are disposed such that first plates 133a that are spline-fitted to the outer peripheral surface of the clutch hub 131 and second plates 133b that are spline-fitted to the inner peripheral surface of the clutch drum 132 are alternately arranged. The piston 134 is placed on the opposite side of the friction engagement plates 133 from the drive gear 151 of the transmission mechanism 150. The piston 134 presses the friction engagement plates 133 as the piston 134 moves toward the drive gear 151.

The third clutch 130 is disengaged when the piston 134 moves to the side away from the drive gear 151 and does not contact the friction engagement plate 133. When the piston 134 moves toward the drive gear 151 and contacts the friction engagement plate 133, transfer torque (torque capacity) is adjusted according to the amount of movement of the piston 134, so that the third clutch 130 is disengaged, slip-engaged, or fully engaged.

The drive unit 140 is used to drive the third clutch 130. The drive unit 140 includes a third motor 141 and a screw mechanism 142. The HV ECU 70 controls the third motor 141. The screw mechanism 142 is configured as a ball screw and converts rotational motion of the third motor 141 to linear motion. The screw mechanism 142 includes a screw shaft member 144, a nut member 145, and a plurality of balls 146 interposed between the screw shaft member 144 and the nut member 145.

The screw shaft member 144 is coupled to the third motor 141 via a worm drive 143. The worm drive 143 is a gear pair of a worm 143a and a worm wheel 143b. The worm 143a is formed integrally with a rotary shaft of the third motor 141. The worm wheel 143b is placed coaxially with the rear wheel-side transmission shaft 121 and is formed integrally with the screw shaft member 144. Rotation of the third motor 141 is reduced in speed and transmitted to the screw shaft member 144 via the worm drive 143.

The nut member 145 is coupled to the screw shaft member 144 such that the nut member 145 is movable in the axial direction of the rear wheel-side transmission shaft 121 with rotation of the screw shaft member 144. The nut member 145 is also coupled to the piston 134 of the third clutch 130 such that the nut member 145 is not movable relative to the piston 134 in the axial direction of the rear wheel-side transmission shaft 121 and is rotatable relative to the piston 134 about the rear wheel-side transmission shaft 121.

The screw mechanism 142 converts rotational motion transmitted from the third motor 141 to the screw shaft member 144 to linear motion of the nut member 145 and transmits the linear motion to the friction engagement plates 133 via the piston 134. The transfer torque (torque capacity) of the third clutch 130 is thus adjusted.

The transmission mechanism 150 includes the drive gear 151, a driven gear 152, and a chain 153. As described above, the drive gear 151 is coupled to the clutch drum 132 of the third clutch 130. The driven gear 152 is attached to the front wheel-side transmission shaft 122. The chain 153 is wrapped around the drive gear 151 and the driven gear 152. The transmission mechanism 150 transmits a driving force that is transmitted to the drive gear 151 to the driven gear 152 via the chain 153.

In the transfer case 120, the rear wheel-side transmission shaft 121 and the drive gear 151 are disconnected when the third clutch 130 is in the disengaged state. At this time, the transfer case 120 transmits all the driving force that is output to the output shaft 62 of the transmission 60 to the rear wheels 39ra, 39rb. In the transfer case 120, the rear wheel-side transmission shaft 121 and the drive gear 151 are connected when the third clutch 130 is in the slip-engaged state or the fully engaged state. At this time, the transfer case 120 splits the driving force that is output to the output shaft 62 of the transmission 60 between the rear wheels 39ra, 39rb and the front wheels 39fa, 39fb. Specifically, when the third clutch 130 is in the slip-engaged state, the rear wheel-side transmission shaft 121 and the drive gear 151 are allowed to rotate differentially, attaining a differential state. When the third clutch 130 is in the fully engaged state, the rear wheel-side transmission shaft 121 and the drive gear 151 rotate together, attaining a non-differential state (what is called a center differential locked state). The transfer case 120 thus continuously changes the front-to-rear driving force split between, e.g., 0:100 and 50:50 as described above as the transfer torque of the third clutch 130 is controlled by control of the third motor 141.

As shown in FIG. 1, the hydraulic brake device 90 includes brake pads 92fa, 92fb, 92ra, 92rb attached to the front wheels 39fa, 39fb and the rear wheels 39ra, 39rb, and a brake actuator 94. The brake actuator 94 is configured as an actuator for adjusting oil pressures of brake wheel cylinders, not shown, that drive the brake pads 92fa, 92fb, 92ra, 92rb and thus applying a braking force to the front wheels 39fa, 39fb and the rear wheels 39ra, 39rb. A brake electronic control unit (brake ECU) 96 controls driving of the brake actuator 94.

Although not shown in the figures, the brake ECU 96 is configured as a microprocessor mainly composed of a CPU. The brake ECU 96 includes, in addition to the CPU, a ROM that stores processing programs, a RAM that temporarily stores data, input and output ports, and a communication port. The brake ECU 96 receives, via the input port, signals from various sensors which are necessary to control driving of the brake actuator 94. Examples of the signals that are input to the brake ECU 96 include wheel speeds Vfa, Vfb, Vra, Vrb of the front wheels 39fa, 39fb and the rear wheels 39ra, 39rb from wheel speed sensors 97fa, 97fb, 97ra, 97rb attached to the front wheels 39fa, 39fb and the rear wheels 39ra, 39rb. The brake ECU 96 outputs a drive control signal etc. for the brake actuator 94 via the output port. The brake ECU 96 is connected to the HV ECU 70 via the communication port.

The brake ECU 96 determines, based on the wheel speeds Vfa, Vfb, Vra, Vrb of the front wheels 39fa, 39fb and the rear wheels 39ra, 39rb from the wheel speed sensors 97fa, 97fb, 97ra, 97rb, whether any of the front wheels 39fa, 39fb and the rear wheels 39ra, 39rb is slipping due to idling. For example, the brake ECU 96 makes this determination by subtracting a vehicle body speed V from each of the wheel speeds Vfa, Vfb, Vra, Vrb and comparing each of the resultant values with a threshold. When the brake ECU 96 determines that none of the front wheels 39fa, 39fb and the rear wheels 39ra, 39rb is slipping due to idling, the brake ECU 96 sets a slip detection flag fs to a value of 0. When the brake ECU 96 determines that any of the front wheels 39fa, 39fb and the rear wheels 39ra, 39rb is slipping due to idling, the brake ECU 96 sets the slip detection flag Fs to a value of 1.

Although not shown in the figures, the HV ECU 70 is configured as a microprocessor mainly composed of a CPU. The HV ECU 70 includes, in addition to the CPU, a ROM that stores processing programs, a RAM that temporarily stores data, input and output ports, a communication port. The HV ECU 70 receives signals from various sensors via the input port. Examples of the signals that are input to the HV ECU 70 include: a rotational speed Nin of the input shaft 61 of the transmission 60 from a first rotational speed sensor 61a that detects the rotational speed of the input shaft 61 of the transmission 60; a rotational speed Nout of the output shaft 62 of the transmission 60 from a second rotational speed sensor 62a that detects the rotational speed of the output shaft 62 of the transmission 60; and a rotational position θmt of a rotor of the third motor 141 of the transfer case 120 from a third rotational position sensor 141a that detects the rotational position of the rotor of the third motor 141 of the transfer case 120. Examples of the signals that are input to the HV ECU 70 further include: an ignition signal from an ignition switch (IG) 80; a shift position SP from a shift position sensor 82 that detects the position of a shift lever 81; an accelerator operation amount Acc from an accelerator pedal position sensor 84 that detects the amount of depression of an accelerator pedal 83; a brake pedal position BP from a brake pedal position sensor 86 that detects the amount of depression of a brake pedal 85; a steering angle θs from a steering angle sensor 87 that detects the steering angle of a steering wheel, not shown; a vehicle body speed V from a vehicle body speed sensor 88; and an outside air temperature To from an outside air temperature sensor 89. The HV ECU 70 outputs a control signal for the transmission 60, a control signal for the transfer case 120, etc. via the output port.

As described above, the HV ECU 70 is connected to the engine ECU 24, the motor ECU 40, the battery ECU 52, and the brake ECU 96 via the communication port. The HV ECU 70 calculates a gear ratio Gr of the transmission 60 by dividing the rotational speed Nth of the input shaft 61 of the transmission 60 from the first rotational speed sensor 61a by the rotational speed Nout of the output shaft 62 of the transmission 60 from the second rotational speed sensor 62a, and estimates a gear stage Gs of the transmission 60 based on the calculated gear ratio Gr. The HV ECU 70 also estimates the amount of movement of the piston 134 of the third clutch 130, the torque capacity of the third clutch 130, and a rear ratio Rr, based on the rotational position θmt of the rotor of the third motor 141 from the third rotational position sensor 141a. As used herein, the rear ratio Rr refers to the ratio of the driving force that is transmitted to the rear wheels 39ra, 39rb to the total driving force that is transmitted from the output shaft 62 of the transmission 60 to a front differential gear 38f (front wheels 39fa, 39fb) and a rear differential gear 38r (rear wheels 39ra, 39rb) via the transfer case 120. As described above, the transfer case 120 is capable of continuously changing the front-to-rear driving force split between, e.g., 0:100 and 50:50. Accordingly, the rear ratio Rr is between, e.g., 0.5 to 1.0.

In the hybrid car 20 of the embodiment configured as described above, the HV ECU 70, the engine ECU 24, and the motor ECU 40 are cooperatively controlled to control the engine 22, the first and second motors MG1, MG2, the transmission 60, and the transfer case 120 so that the hybrid car 20 travels in hybrid vehicle mode (HV mode) or electric vehicle mode (EV mode). The HV mode is a mode in which the hybrid car 20 travels with the engine 22 being operated, and the EV mode is a mode in the hybrid car 20 travels without operating the engine 22.

The transmission 60 is basically controlled as follows. The HV ECU 70 sets requested output shaft torque Tout* requested for the output shaft (drive shaft) 62 of the transmission 60, based on the accelerator operation amount Acc and the vehicle body speed V. The HV ECU 70 also sets a desired gear stage Gs* of the transmission 60 based on the requested output shaft torque Tout* and the vehicle body speed V. The HV ECU 70 then controls the transmission 60 so as to achieve the desired gear stage Gs* of the transmission 60.

The transfer case 120 is basically controlled as follows. The HV ECU 70 sets a desired rear ratio Rr* based on the accelerator operation amount Acc, the vehicle body speed V, the steering angle θs, whether any of the front wheels 39fa, 39fb and the rear wheels 39ra, 39rb is slipping due to idling, etc. The HV ECU 70 then controls the transfer case 120 so as to achieve the desired rear rate Rr*.

Figure 6:
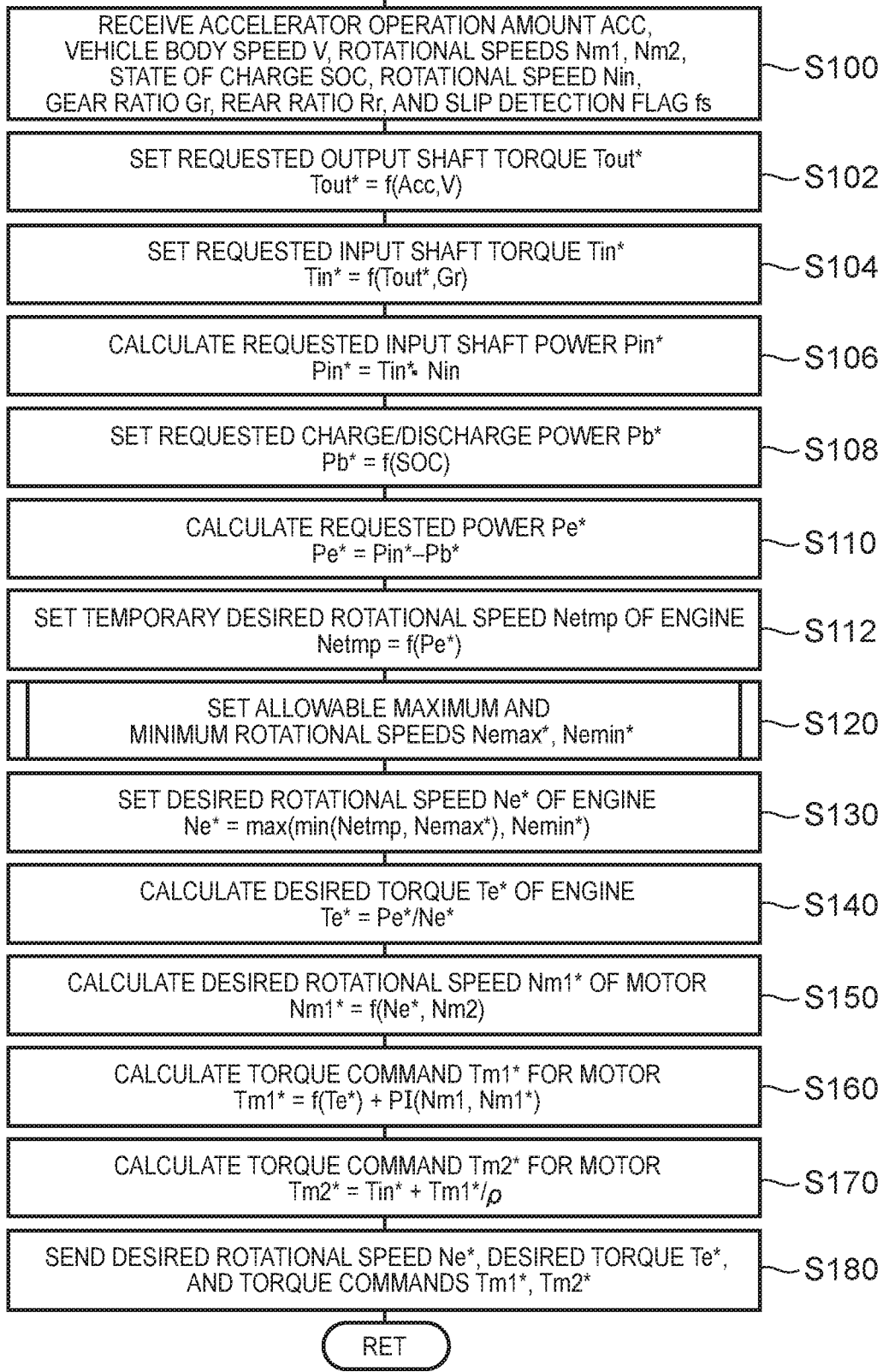
FIG. 6 is a flowchart illustrating an example of a control routine that is executed by an I-IV ECU shown in FIG. 1.

Next, operation of the hybrid car 20 of the embodiment configured as described above will be described especially regarding how the engine 22, the first motor MG1, and the second motor MG2 are specifically controlled in HV mode. FIG. 6 is a flowchart illustrating an example of a control routine that is executed by the HV ECU 70. The HV ECU 70 repeatedly executes this routine.

In the control routine of FIG. 6, the HV ECU 70 first receives data such as the accelerator operation amount Acc, the vehicle body speed V, the rotational speeds Nm1, Nm2 of the first and second motors MG1, MG2, the state of charge SOC of the battery 50, the rotational speed Nth of the input shaft 61 of the transmission 60, the gear ratio Gr of the transmission 60, the rear ratio Rr, and the slip detection flag fs (step S100). In this example, the accelerator operation amount Acc is a value detected by the accelerator pedal position sensor 84. The vehicle body speed V is a value detected by the vehicle body speed sensor 88. The rotational speeds Nm1, Nm2 of the first and second motors MG1, MG2 are values calculated by the motor ECU 40, and the HV ECU 70 receive these values from the motor ECU 40 by communication. The state of charge SOC of the battery 50 is a value calculated by the battery ECU 52, and the HV ECU 70 receives this value from the battery ECU 52 by communication. The rotational speed Nin of the input shaft 61 of the transmission 60 is a value detected by the first rotational speed sensor 61a. The gear ratio Gr of the transmission 60 and the rear ratio Rr are values recognized by the HV ECU 70. The slip detection flag fs is a value set by the brake ECU 96, and the HV ECU 70 receives this value from the brake ECU 96 by communication.

Once the HV ECU 70 receives the data, the HV ECU 70 sets requested output shaft torque Tout* requested for the output shaft 62 of transmission 60, based on the accelerator operation amount Acc and the vehicle body speed V (step S102). The HV ECU 70 also sets requested input shaft torque Tin* requested for the input shaft 61 of the transmission 60, based on the requested output shaft torque Tout* and the gear ratio Gr of the transmission 60 (step S104).

The HV ECU 70 then calculates requested input shaft power Pin* requested for the input shaft 61 of the transmission 60 by multiplying the requested input shaft torque Tin* by the rotational speed Nth of the input shaft 61 of the transmission 60 (step S106). The HV ECU 70 also sets requested charge/discharge power Pb* of the battery 50 (which takes a positive value when power is discharged from the battery 50), based on the state of charge SOC of the battery 50 (step S108).

Thereafter, the HV ECU 70 calculates requested engine power Pe* requested for the engine 22 by subtracting the requested charge/discharge power Pb* of the battery 50 from the requested input shaft power Pin* (step S110). The HV ECU 70 also sets a temporary desired rotational speed Netmp, which is a temporary value of a desired rotational speed Ne* of the engine 22, based on the requested engine power Pe* and an operation line of the engine 22 (step S112). The operation line of the engine 22 is, e.g., a fuel efficiency operation line for efficiently operating the engine 22.

Figure 7:
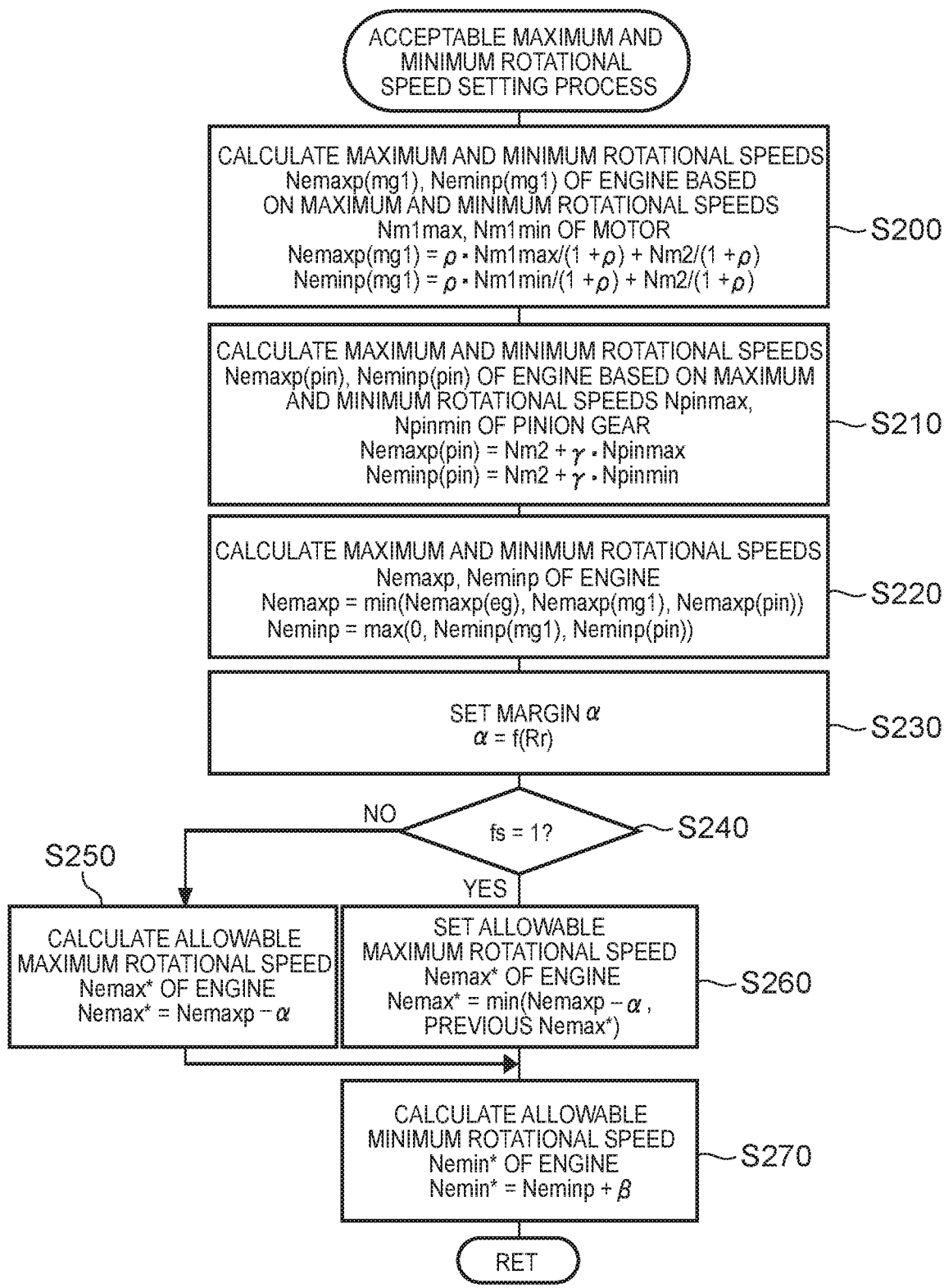
FIG. 7 is a flowchart illustrating an example of an allowable maximum and minimum rotational speed setting process for the engine.

Subsequently, the HV ECU 70 then sets allowable maximum and minimum rotational speeds Nemax*, Nemin* of the engine 22 for control by performing an allowable maximum and minimum rotational speed setting process shown in FIG. 7 (step S120). The allowable maximum and minimum rotational speed setting process will be described later. The HV ECU 70 then sets a desired rotational speed Ne* of the engine 22 by limiting (guarding) the temporary desired rotational speed Netmp of the engine 22 by the allowable maximum and minimum rotational speeds Nemax*, Nemin* as given by the expression (1) below (step S130). The HV ECU 70 calculates desired torque Te* of the engine 22 by dividing the requested engine power Pe* by the set desired rotational speed Ne* (step S140).

$$Ne^*=\max(\min(Netmp,Nemax^*),Nemin^*) \quad (1)$$

Subsequently, the HV ECU 70 calculates a desired rotational speed Nm1* of the first motor MG1 as given by the expression (2) below using the desired rotational speed Ne* of the engine 22, a rotational speed Nr of the ring gear 30*r* of the planetary gear 30 (=the rotational speed Nm2 of the second motor MG2), and a gear ratio ρ of the planetary gear 30 (=the number of teeth of the sun gear 30*s*/the number of teeth of the ring gear 30*r*) (step S150). The expression (2) is a mechanical relational expression for each rotary element of the planetary gear 30. This expression (2) is easily obtained using the collinear chart of FIG. 4.

$$Nm1^*=Ne^*\cdot(1+\rho)/\rho-Nm2/\rho \quad (2)$$

The HV ECU 70 then calculates a torque command Tm1* for the first motor MG1 as given by the expression (3) below using the desired torque Te* of the engine 22 and the rotational speed Nm1 and the desired rotational speed Nm1* of the first motor MG1 (step S160). The expression (3) is a relational expression in feedback control for rotating the first motor MG1 at the desired rotational speed Nm1* (rotating the engine 22 at the desired rotational speed Ne*). The first term on the right side of the expression (3) is easily obtained using the collinear chart of FIG. 4, "k1" in the second term on the right side of the expression (3) is the gain of the proportional term, and "k2" in the third term on the right side of the expression (3) is the gain of the integral term.

$$Tm1^*=-\rho\cdot Te^*/(1+\rho)+k1(Nm1^*-Nm1)+k2\!\int\!(Nm1^*-Nm1)dt \quad (3)$$

The HV ECU 70 then calculates a torque command Tm2* for the second motor MG2 as given by the expression (4) below using the requested input shaft torque Tin*, the torque command Tm1* for the first motor MG1, and the gear ratio ρ of the planetary gear 30 (step S170). The expression (4) is easily obtained using the collinear chart of FIG. 4.

$$Tm2^*=Tin^*+Tm1^*/\rho \quad (4)$$

Once the HV ECU 70 thus obtains the desired rotational speed Ne* and the desired torque Te* of the engine 22 and the torque commands Tm1*, Tm2* for the first and second motors MG1, MG2, the HV ECU 70 sends the desired rotational speed Ne* and the desired torque Te* of the engine 22 to the engine ECU 24 and sends the torque commands Tm1*, Tm2* for the first and second motors MG1, MG2 to the motor ECU 40 (step S180). The HV ECU 70 then ends the routine. When the engine ECU 24 receives the desired rotational speed Ne* and the desired torque Te* of the engine 22, the engine ECU 24 performs intake air amount control, fuel injection control, ignition control, etc. of the engine 22 so that the engine 22 operates based on the desired rotational speed Ne* and the desired torque Te*. When the motor ECU 40 receives the torque commands Tm1*, Tm2* for the first and second motors MG1, MG2, the motor ECU 40 performs switching control of the switching elements of the first and second inverters 41, 42 so that the first and second motors MG1, MG2 are driven according to the torque commands Tm1*, Tm2*.

Next, step S120 of the control routine of FIG. 6, that is, a process of setting the allowable maximum and minimum rotational speeds Nemax*, Nemin* of the engine 22 by the allowable maximum and minimum rotational speed setting process illustrated in FIG. 7, will be described.

In the allowable maximum and minimum rotational speed setting process of FIG. 7, the HV ECU 70 first calculates maximum and minimum rotational speeds Nemaxp(mg1), Neminp(mg1) of the engine 22, which are based on the capability of the first motor MG1, as given by the expressions (5), (6) below using maximum and minimum rotational speeds Nm1max, Nm1min according to the capability of the first motor MG1, the rotational speed Nr of the ring gear 30*r* of the planetary gear 30 (=the rotational speed Nm2 of the second motor MG2=the rotational speed Nth of the input shaft 61 of the transmission 60), and the gear ratio ρ of the planetary gear 30 (step S200). The maximum and minimum rotational speeds Nm1max, Nm1min according to the capability of the first motor MG1 are a rated maximum rotational speed on the positive rotation side and a rated minimum rotational speed on the negative rotation side of the first motor MG1. The expressions (5), (6) are easily obtained using the collinear chart of FIG. 4.

$$Nemaxp(mg1)=\rho\cdot Nm1\max/(1+\rho)+Nm2/(1+\rho) \quad (5)$$

$$Neminp(mg1)=\rho\cdot Nm1\min/(1+\rho)+Nm2/(1+\rho) \quad (6)$$

The HV ECU 70 then calculates maximum and minimum rotational speeds Nemaxp(pin), Neminp(pin) of the engine 22, which are based on the capability of the pinion gear 30*p* of the planetary gear 30, as given by the expressions (7), (8) below using maximum and minimum rotational speeds Npinmax, Npinmin according to the capability of the pinion gear 30*p* of the planetary gear 30, the rotational speed Nr of the ring gear 30*r* of the planetary gear 30 (=the rotational speed Nm2 of the second motor MG2=the rotational speed Nth of the input shaft 61 of the transmission 60), and a gear ratio γ of the pinion gear 30*p* in the planetary gear 30 (=the number of teeth of the pinion gear 30*p*/the number of teeth of the ring gear 30*r*) (step S210). The maximum and minimum rotational speeds Npinmax, Npinmin according to the capability of the pinion gear 30*p* are a rated maximum rotational speed on the positive rotation side and a rated minimum rotational speed on the negative rotation side of the pinion gear 30*p* of the planetary gear 30.

$$Nemaxp(pin)=Nm2+\gamma\cdot Npinmax \quad (7)$$

$$Neminp(pin)=Nm2+\gamma\cdot Npinmin \quad (8)$$

Thereafter, the HV ECU 70 sets maximum and minimum rotational speeds Nemaxp, Neminp of the engine 22 for part protection as given by the expressions (9), (10) below (step S220). As shown by the expression (9), the maximum rotational speed Nemaxp of the engine 22 is obtained as the smallest value out of a maximum rotational speed Nemaxp (eg) according to the capability of the engine 22, the maximum rotational speed Nemaxp(mg1) of the engine 22, and the maximum rotational speed Nemaxp(pin) of the engine 22. The maximum rotational speed Nemaxp(eg) according to the capability of the engine 22 is a rated maximum rotational speed of the engine 22. As shown by the expression (10), the minimum rotational speed Neminp of the engine 22 is obtained as the maximum value out of a value of 0, which is a minimum rotational speed of the engine 22 according to the capability of the engine 22, the minimum rotational speed Neminp(mg1) of the engine 22, and the minimum rotational speed Neminp(pin) of the engine 22.

$$Nemaxp=\min(Nemaxp(eg),Nemaxp(mg1),Nemaxp(pin)) \quad (9)$$

$$Neminp=\max(0,Neminp(mg1),Neminp(pin)) \quad (10)$$

Figure 8:
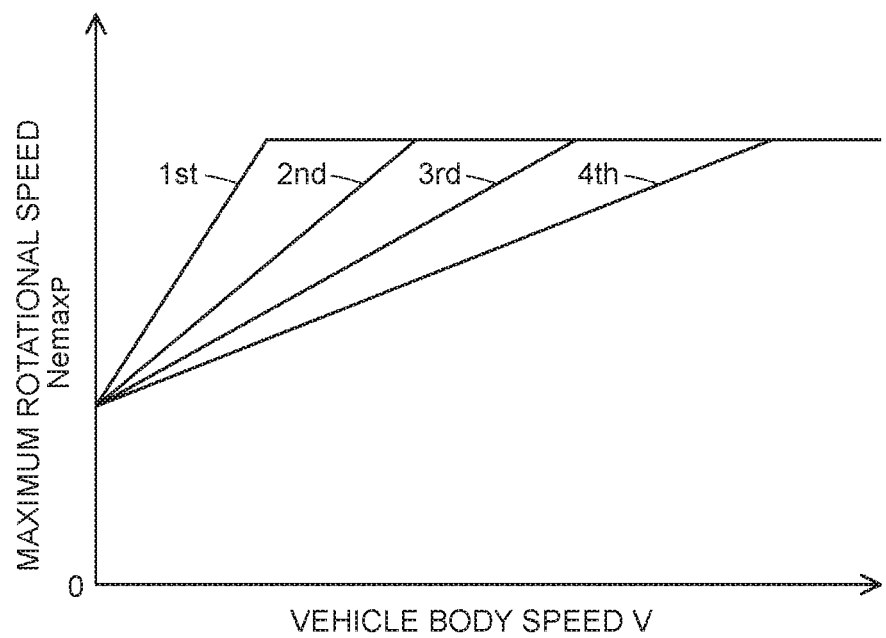
FIG. 8 is a graph illustrating an example of the relationship among the gear stage of the transmission, a vehicle body speed (rotational speed of an output shaft of the transmission), and a maximum rotational speed of the engine.

FIG. 8 is a graph illustrating an example of the relationship among the gear stage Gs of the transmission 60, the vehicle body speed V (the rotational speed Nout of the output shaft 62 of the transmission 60), and the maximum rotational speed Nemaxp of the engine 22. As shown in the figure, for each vehicle body speed V, the maximum rotational speed Nemaxp of the engine 22 is different depending on the gear stage Gs (gear ratio Gr) of the transmission 60. This is because, for each vehicle body speed V, the rotational speed Nin of the input shaft 61 of the transmission 60 (the rotational speed Nm2 of the second motor MG2) is different depending on the gear stage Gs of the transmission 60, and the maximum and minimum rotational speeds Nemaxp (mg1), Neminp(mg1) and the maximum and minimum rotational speeds Nemaxp(pin), Neminp(pin) of the engine 22 are different depending on the gear stage Gs of the transmission 60. Similarly, for each vehicle body speed V, the minimum rotational speed Neminp of the engine 22 is also different depending on the gear stage Gs of the transmission 60.

Figure 9:
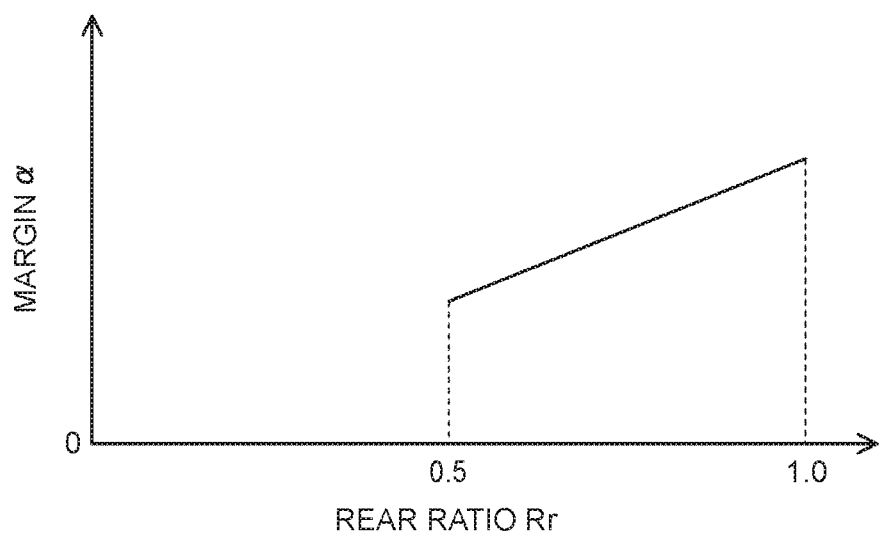
FIG. 9 is a graph illustrating a first example of a margin setting map that is used to set the maximum rotational speed of the engine.

Subsequently, the HV ECU 70 sets a margin α using the rear ratio Rr and a margin setting map (step S230). The margin setting map is determined in advance as a relationship between the rear ratio Rr and the margin α and is stored in the ROM (not shown). FIG. 9 is a graph illustrating an example of the margin setting map. As shown in the figure, the margin α is set so that the margin α decreases as the rear ratio Rr decreases (as the rear ratio Rr decreases from 1.0 toward 0.5). The reason for this will be described later.

Once the HV ECU 70 thus sets the margin α, the HV ECU 70 checks the value of the slip detection flag fs (step S240). When the value of the slip detection flag fs is 0, the HV ECU 70 determines that none of the front wheels 39fa, 39fb and the rear wheels 39ra, 39rb is slipping due to idling. In this case, the HV ECU 70 calculates the allowable maximum rotational speed Nemax* of the engine 22 by subtracting the margin α from the maximum rotational speed Nemaxp of the engine 22 (step S250). The HV ECU 70 also calculates the allowable minimum rotational speed Nemin* of the engine 22 by adding a margin β to the minimum rotational speed Neminp of the engine 22 (step S270). The HV ECU 70 then ends the routine. The margin β is determined as appropriate.

Once the HV ECU 70 thus obtains the allowable maximum and minimum rotational speeds Nemax*, Nemin* of the engine 22, the HV ECU 70 sets the desired rotational speed Ne* of the engine 22 by limiting (guarding) the temporary desired rotational speed Netmp of the engine 22 by the allowable maximum and minimum rotational speeds Nemax*, Nemin*, and calculates the desired torque Te* of the engine 22 by dividing the requested engine power Pe* by the desired rotational speed Ne* of the engine 22.

The reason why the margin α is set so that the margin α decreases as the rear ratio Rr decreases (as the rear ratio Rr decreases from 1.0 toward 0.5) will be described. By setting the margin α in this manner, the HV ECU 70 sets the allowable maximum rotational speed Nemax* of the engine 22 so that the allowable maximum rotational speed Nemax* increases as the rear ratio Rr decreases. When the rear ratio Rr is relatively low (e.g., 0.5 or 0.6), the difference in driving force between the front wheels 39fa, 39fb and the rear wheels 39ra, 39rb is typically smaller and the front wheels 39fa, 39fb and the rear wheels 39ra, 39rb are less likely to slip due to idling, as compared to when the rear ratio Rr is relatively high (e.g., 0.9 or 1.0). When any of the front wheels 39fa, 39fb and the rear wheels 39ra, 39rb slips due to idling, the wheel speed of the slipping wheel rapidly increases. As a result, the rotational speed Nout of the output shaft 62 of the transmission 60, the rotational speed Nth of the input shaft 61 of the transmission 60, and the rotational speed Ne of the engine 22 rapidly increase accordingly. The rotational speed Ne of the engine 22 therefore may become higher than the allowable maximum rotational speed Nemax*. Accordingly, when the rear ratio Rr is relatively high, the allowable maximum rotational speed Nemax* of the engine 22 is set to a relatively low value. The rotational speed Ne of the engine 22 is thus more sufficiently restrained from becoming higher than the maximum rotational speed Nemaxp for part protection (the engine 22, the first motor MG1, and the pinion gears 30p of the planetary gear 30 are more sufficiently restrained from rotating at high speeds). Parts are thus more sufficiently protected. When the rear ratio Rr is relatively low, the allowable maximum rotational speed Nemax* of the engine 22 is set to a relatively high value. Parts are thus protected and deterioration in drivability is also reduced. Based on these, it can be said that both protection of parts and reduction in deterioration in drivability are achieved.

When the value of the slip detection flag fs is 1 in step S240, the HV ECU 70 determines any of the front wheels 39fa, 39fb and the rear wheels 39ra, 39rb is slipping due to idling. The HV ECU 70 sets the allowable maximum rotational speed Nemax* of the engine 22 by subtracting the margin α from the maximum rotational speed Nemaxp of the engine 22 and guarding the resultant value by the previous allowable maximum rotational speed Nemax* (previous Nemax*) of the engine 22 as given by the expression (11) below (step S260). The HV ECU 70 also calculates the allowable minimum rotational speed Nemin* of the engine 22 by step S270 described above. The HV ECU 70 then ends the routine.

$$Nemax*=\min(Nemaxp-\alpha,\text{previous } Nemax*) \quad (11)$$

By performing step S260, the allowable maximum rotational speed Nemax* of the engine 22 is prohibited from increasing from its current value while any of the front wheels 39fa, 39fb and the rear wheels 39ra, 39rb is slipping due to idling. The rotational speed Ne of the engine 22 is thus restrained from becoming higher than the maximum rotational speed Nemaxp for part protection, namely the engine 22, the first motor MG1, and the pinion gears 30p of the planetary gear 30 are restrained from rotating at high speeds, when any of the front wheels 39fa, 39fb and the rear wheels 39ra, 39rb is slipping due to idling.

In the hybrid car 20 of the embodiment described above, the HV ECU 70, the engine ECU 24, and the motor ECU 40 control the engine 22 and the first and second motors MG1, MG2 so that the hybrid car 20 travels with the engine 22 rotating within the range of the allowable maximum rotational speed Nemax* or less. In this case, the HV ECU 70 sets the allowable maximum rotational speed Nemax* of the engine 22 so that the allowable maximum rotational speed Nemax* is higher when the rear ratio Rr is low than when the rear ratio Rr is high. The rotational speed Ne of the engine 22 is thus sufficiently restrained from becoming higher than the maximum rotational speed Nemaxp for part protection, that is, the engine 22, the first motor MG1, and the pinion gears 30*p* of the planetary gear 30 are sufficiently restrained from rotating at high speeds, when the rear ratio Rr is relatively high. Parts are thus more sufficiently protected. When the rear ratio Rr is relatively low, parts are protected and deterioration in drivability is also reduced. Based on these, it can be said that both protection of parts and reduction in deterioration in drivability are achieved.

In the hybrid car 20 of the embodiment, the HV ECU 70 sets the margin α using the rear ratio Rr. However, the HV ECU 70 may set the margin α using the rear ratio Rr and the outside air temperature To or may set the margin α using the rear ratio Rr and a low μ road flag Fμ. The low μ road flag F μ is a flag that is set to a value of 1 when the hybrid car 20 is traveling on a low μ road having a surface with a friction coefficient equal to or lower than a threshold (e.g., 0.3, 0.35, 0.4) and that is set to a value of 0 when the hybrid car 20 is not traveling on a low μ road. Examples of the "low μ road" include a wet road surface, a snowy road, and an icy road. The HV ECU 70 determines whether the hybrid car 20 is traveling on a low μ road by, e.g., comparing a variation (difference between maximum and minimum values) among the wheel speeds Vfa, Vfb, Vra, Vrb of the front wheels 39*fa*, 39*fb* and the rear wheels 39*ra*, 39*rb* from the wheel speed sensors 97*fa*, 97*fb*, 97*ra*, 97*rb* with a threshold.

Figure 10:
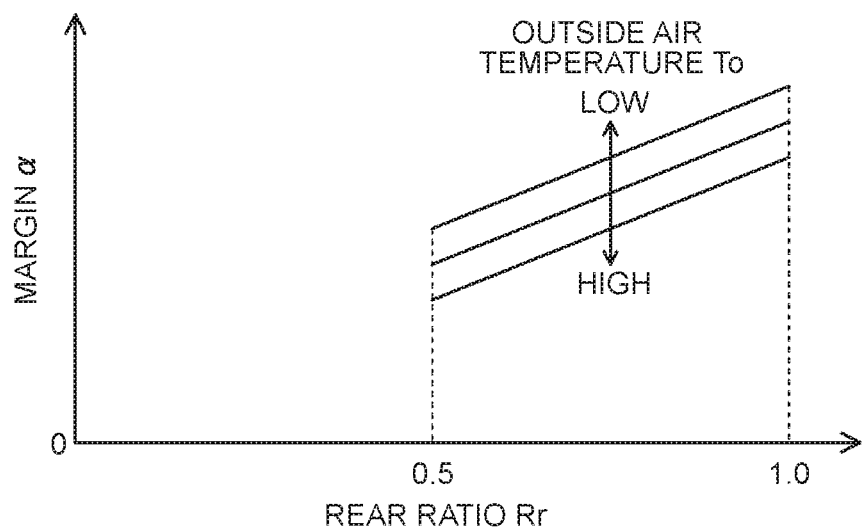
FIG. 10 is a graph illustrating a second example of the margin setting map.

FIG. 10 is a graph illustrating an example of a margin setting map that is used to set the margin α using the rear ratio Rr and the outside air temperature To. In the example of FIG. 10, the margin α is set so that the margin α decreases as the rear ratio Rr decreases (as the rear ratio Rr decreases from 1.0 toward 0.5) and so that the margin α increases as the outside air temperature To decreases. The relationship between the rear ratio Rr and the margin α is described above. The relationship between the outside air temperature To and the margin α is based on the fact that the lower the outside air temperature To is, the colder the road surface is and the more likely the front wheels 39*fa*, 39*fb* and the rear wheels 39*ra*, 39*rb* are to slip due to idling.

Figure 11:
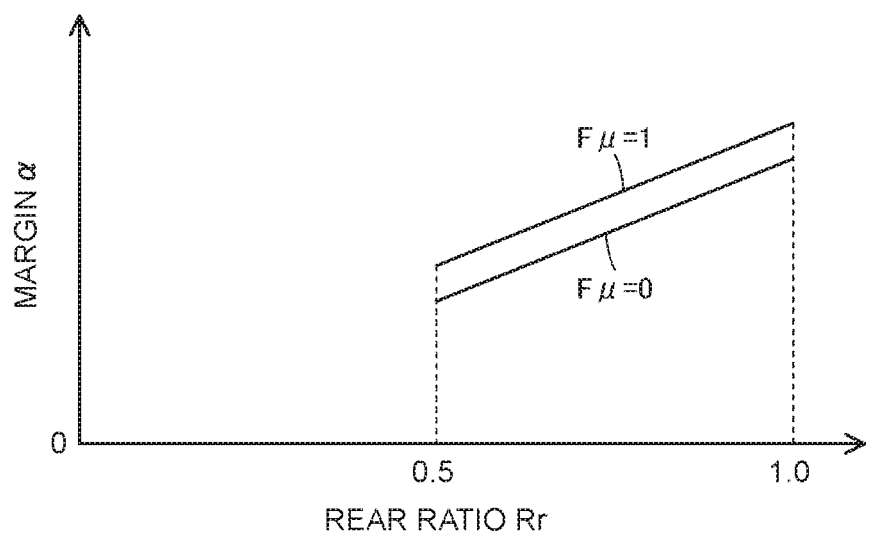
FIG. 11 is a graph illustrating a third example of the margin setting map.

FIG. 11 is a graph illustrating an example of a margin setting map that is used to set the margin α using the rear ratio Rr and the low μ road flag Fμ. In the example of FIG. 11, the margin α is set so that the margin α decreases as the rear ratio Rr decreases (as the rear ratio Rr decreases from 1.0 toward 0.5) and so that the margin α is larger when the value of the low μ road flag F μ is 1 than when the value of the low μ road flag F μ is 0. The relationship between the low μ road flag F μ and the margin α is based on the fact that the front wheels 39*fa*, 39*fb* and the rear wheels 39*ra*, 39*rb* are more likely to slip due to idling when the hybrid car 20 travels on a low μ road than when the hybrid car 20 travels on a road other than the low μ road.

In the hybrid car 20 of the embodiment, the HV ECU 70 prohibits the allowable maximum rotational speed Nemax* of the engine 22 from increasing from its current value while slipping of any of the front wheels 39*fa*, 39*fb* and the rear wheels 39*ra*, 39*rb* is detected. However, the HV ECU 70 may prohibit the allowable maximum rotational speed Nemax* of the engine 22 from increasing from its current value while traction control (TRC) that reduces slipping of the front wheels 39*fa*, 39*fb* and the rear wheels 39*ra*, 39*rb* is in operation, instead of, or in addition to, while slipping of any of the front wheels 39*fa*, 39*fb* and the rear wheels 39*ra*, 39*rb* is detected. The rotational speed Ne of the engine 22 is thus restrained from becoming higher than the maximum rotational speed Nemaxp for part protection (the engine 22, the first motor MG1, and the pinion gears 30*p* of the planetary gear 30 are restrained from rotating at high speeds) while the traction control is in operation.

In the hybrid car 20 of the embodiment, the HV ECU 70 prohibits the allowable maximum rotational speed Nemax* of the engine 22 from increasing from its current value while slipping of any of the front wheels 39*fa*, 39*fb* and the rear wheels 39*ra*, 39*rb* is detected. However, the HV ECU 70 may not prohibit the allowable maximum rotational speed Nemax* of the engine 22 from increasing from its current value (may allow the allowable maximum rotational speed Nemax* of the engine 22 to increase from its current value) even while slipping of any of the front wheels 39*fa*, 39*fb* and the rear wheels 39*ra*, 39*rb* is detected.

In the hybrid car 20 of the embodiment, the second motor MG2 is directly connected to the input shaft 61 of the transmission 60. However, the second motor MG2 may be connected to the input shaft 61 of the transmission 60 via a speed reducer. The second motor MG2 may be directly connected to the output shaft 62 of the transmission 60. The second motor MG2 may be connected to the output shaft 62 of the transmission 60 via a speed reducer.

In the hybrid car 20 of the embodiment, the drive unit 140 of the transfer case 120 includes the third motor 141 and the screw mechanism 142 that converts rotational motion of the third motor 141 to linear motion to drive the piston 134 of the third clutch 130 (to move the piston 134 in the axial direction of the piston 134). However, the drive unit 140 may include a cam mechanism that converts rotational motion of the third motor 141 to linear motion, instead of the screw mechanism 142. The drive unit 140 may include a hydraulic controller that hydraulically drives the piston 134, instead of the third motor 141 and the screw mechanism 142.

In the hybrid car 20 of the embodiment, the transfer case 120 is capable of continuously changing the front-to-rear driving force split between, e.g., 0:100 and 50:50. However, the transfer case 120 may be capable of switching the front-to-rear driving force split between two stages, namely between, e.g., 0:100 and 50:50.

In the hybrid car 20 of the embodiment, a four-gear transmission is used as the transmission 60. However, a three-gear transmission, a five-gear transmission, a six-gear transmission, etc. may be used as the transmission 60.

Figure 12:
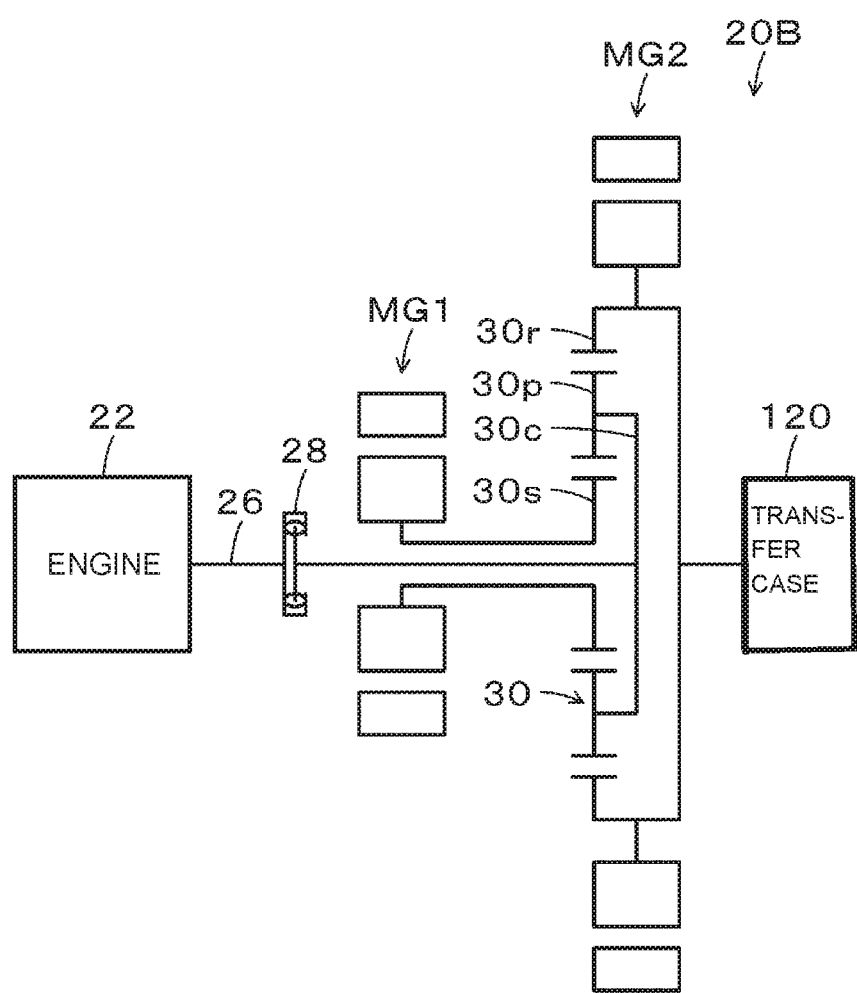
FIG. 12 is a configuration diagram illustrating the general configuration of a hybrid car according to a modification of the embodiment.

The hybrid car 20 of the embodiment includes the transmission 60. Namely, the ring gear 30*r* of the planetary gear 30 and the second motor MG2 are coupled to the rear wheel-side transmission shaft 121 of the transfer case 120 via the transmission 60. However, like a hybrid car 20B of a modification show in FIG. 12, the hybrid car may not include the transmission 60. In the hybrid car 20B of FIG. 12, the planetary gear 30 and the second motor MG2 are directly coupled to the transfer case 120.

In the hybrid car 20 of the embodiment, the battery 50 is used as a power storage device. However, a capacitor may be used as the power storage device.

The hybrid car 20 of the embodiment includes the engine ECU 24, the motor ECU 40, the battery ECU 52, the brake ECU 96, and the HV ECU 70. However, at least two of these ECUs may be configured as a single electronic control unit.

The hybrid car 20 of the embodiment is configured as a part-time four-wheel drive (4WD) vehicle. However, the hybrid car 20 may be configured as a full-time four-wheel drive (4WD) vehicle.

The hybrid car 20 of the embodiment is configured as a rear-wheel drive four-wheel drive vehicle in which the rear wheels 39*ra*, 39*rb* are main drive wheels and the front wheels 39*fa*, 39*fb* are sub drive wheels. However, the hybrid car 20 may be configured as a front-wheel drive four-wheel drive vehicle in which the front wheels 39*fa*, 39th are main drive wheels and the rear wheels 39*ra*, 39*rb* are sub drive wheels.

Correspondence between the main elements of the embodiment and the main elements of the disclosure described in "SUMMARY" will be described. In the embodiment, the engine 22 is an example of the "engine." The first motor MG1 is an example of the "first motor." The planetary gear 30 is an example of the "differential unit." The second motor MG2 is an example of the "second motor." The transfer case 120 is an example of the "driving force split device." The HV ECU 70, the engine ECU 24, and the motor ECU 40 are an example of the "controller." The transmission 60 is an example of the "transmission."

The correspondence between the main elements of the embodiment and the main elements of the disclosure described in "SUMMARY" is shown merely by way of example in order to specifically describe the mode in which the embodiment carries out the disclosure described in "SUMMARY" Therefore, the correspondence is not intended to limit the elements of the disclosure described in "SUMMARY" That is, the disclosure described in "SUMMARY" should be interpreted based on the description in "SUMMARY" and the embodiment is merely a specific example of the disclosure described in "SUMMARY."

Although the mode for carrying out the disclosure is described above based on the embodiment, the disclosure is not limited in any way to the embodiment and can be carried out in various forms without departing from the spirit and scope of the disclosure.

The disclosure is applicable to the manufacturing industry of hybrid vehicles etc.

What is claimed is:

1. A hybrid vehicle, comprising:
an engine;
a first motor;
a differential unit including three rotary elements connected to a drive shaft, the engine, and the first motor;
a second motor configured to output a driving force to the drive shaft;
a driving force split device configured to transmit the driving force from the drive shaft to a main drive wheel and a sub drive wheel and to adjust a main-side ratio, the main-side ratio being a ratio of the driving force that is transmitted to the main drive wheel to a total driving force that is transmitted from the drive shaft to the main drive wheel and the sub drive wheel via the driving force split device; and
a controller configured to control the engine, the first motor, and the second motor such that the hybrid vehicle travels with the engine rotating within a range of an allowable maximum rotational speed for control or less,
wherein the controller is configured to set the allowable maximum rotational speed such that the allowable maximum rotational speed is higher when the main-side ratio is lower than when the main-side ratio is higher.

2. The hybrid vehicle according to claim 1, wherein the controller is configured to set the allowable maximum rotational speed such that the allowable maximum rotational speed increases as the main-side ratio decreases.

3. The hybrid vehicle according to claim 1, wherein the controller is configured to set the allowable maximum rotational speed such that the allowable maximum rotational speed decreases as an outside air temperature decreases.

4. The hybrid vehicle according to claim 1, wherein the controller is configured to set the allowable maximum rotational speed such that the allowable maximum rotational speed is lower when the hybrid vehicle travels on a low μ road than when the hybrid vehicle travels on a road other than the low μ road, the low μ road being a road having a surface with a friction coefficient equal to or lower than a predetermined value.

5. The hybrid vehicle according to claim 1, wherein the controller is configured to prohibit the allowable maximum rotational speed from increasing from a current value of the allowable maximum rotational speed when either a first condition or a second condition is satisfied, the first condition being a condition that slipping of either the main drive wheel or the sub drive wheel is detected, and the second condition being a condition that a slipping reducing function to reduce slipping of the main drive wheel and the sub drive wheel is in operation.

6. The hybrid vehicle according to claim 1, wherein:
the controller is configured to set the allowable maximum rotational speed by subtracting a margin from a maximum rotational speed for part protection, the maximum rotational speed for part protection being a maximum rotational speed obtained as one of a first maximum rotational speed of the engine based on capability of the engine, a second maximum rotational speed of the engine based on capability of the first motor, and a third maximum rotational speed of the engine based on capability of the differential unit; and
the controller is configured to increase the allowable maximum rotational speed by reducing the margin when the main-side ratio is low as compared to when the main-side ratio is high.

7. The hybrid vehicle according to claim 1, further comprising a transmission that transmits power between an input shaft connected to the differential unit and the drive shaft with a change in gear stage,
wherein the second motor is connected to the input shaft or the drive shaft, and
wherein the controller is configured to set the allowable maximum rotational speed based on the main-side ratio and a rotational speed of the input shaft of the transmission.

8. A method for controlling a hybrid vehicle, the hybrid vehicle including
an engine,
a first motor,
a differential unit including three rotary elements connected to a drive shaft, the engine, and the first motor,
a second motor configured to output a driving force to the drive shaft, and
a driving force split device configured to transmit the driving force from the drive shaft to a main drive wheel and a sub drive wheel and to adjust a main-side ratio, the main-side ratio being a ratio of the driving force that is transmitted to the main drive wheel to a total driving force that is transmitted from the drive shaft to the main drive wheel and the sub drive wheel via the driving force split device,
the method comprising:
controlling the engine, the first motor, and the second motor such that the hybrid vehicle travels with the engine rotating within a range of an allowable maximum rotational speed for control or less; and
setting the allowable maximum rotational speed such that the allowable maximum rotational speed is higher when the main-side ratio is lower than when the main-side ratio is higher.

* * * * *